(12) United States Patent
Stones

(10) Patent No.: US 7,360,311 B2
(45) Date of Patent: Apr. 22, 2008

(54) DRIVE MECHANISM FOR POWER TOOL

(75) Inventor: Kevin Stones, Bishop Auckland (GB)

(73) Assignee: Black & Decker Inc., Newark, DE (US)

( * ) Notice: Subject to any disclaimer, the term of this patent is extended or adjusted under 35 U.S.C. 154(b) by 130 days.

(21) Appl. No.: 10/911,417

(22) Filed: Aug. 4, 2004

(65) Prior Publication Data
US 2005/0076512 A1 Apr. 14, 2005

(30) Foreign Application Priority Data

Aug. 4, 2003 (GB) ................. 0318150.0
Aug. 9, 2003 (GB) ................. 0318751.5
May 17, 2004 (GB) ................. 0410913.8

(51) Int. Cl.
B26B 19/02 (2006.01)
(52) U.S. Cl. ............... 30/216; 30/210; 30/392
(58) Field of Classification Search ............ 30/208, 30/209, 210, 215, 216, 392, 393
See application file for complete search history.

(56) References Cited

U.S. PATENT DOCUMENTS

| 2,961,016 | A | * | 11/1960 | Papworth | 30/393 |
| 3,579,827 | A | * | 5/1971 | Grahn | 30/144 |
| 3,802,075 | A | * | 4/1974 | Taylor et al. | 30/216 |
| 3,897,630 | A | * | 8/1975 | Glover et al. | 30/220 |
| 3,902,243 | A | | 9/1975 | Klebe, Jr. | |
| 4,206,657 | A | | 6/1980 | Palm | |
| 4,286,675 | A | * | 9/1981 | Tuggle | 173/213 |
| 4,991,298 | A | * | 2/1991 | Matre | 30/392 |
| 5,150,523 | A | | 9/1992 | McCurry | |
| 5,253,382 | A | * | 10/1993 | Beny | 15/22.1 |
| 5,581,891 | A | * | 12/1996 | Wheeler et al. | 30/216 |

(Continued)

FOREIGN PATENT DOCUMENTS

EP 0214455 A1 3/1987

(Continued)

Primary Examiner—Hwei-Siu C. Payer
(74) Attorney, Agent, or Firm—John Yun; Bruce S. Shapiro; Wesley Muller

(57) ABSTRACT

A drive mechanism for a power tool having a housing, a motor, and an output shaft moving in a reciprocating motion. The drive mechanism comprises a gear plate (34) adapted to rotate about a first axis (Z-Z) and having a plurality of elongate first teeth (33) extending perpendicular to the first axis; and a drive conversion mechanism cooperating with the gear plate (34) to cause reciprocating movement of the output shaft in response to rotation of the gear plate about the first axis. Conventional drive mechanisms having an output shaft with a reciprocating motion generally have bevel gears with teeth formed at 45° to the axis of rotation of the gears. By providing a gear plate and a drive conversion mechanism which provides a reciprocating drive force for an output shaft with teeth formed at 90° to the axis of rotation of the gear, the gear is cheaper and easier to make as the gear teeth do not have to be formed as accurately as prior art inclined gear teeth. Also, the gear plate does not need to be as accurately located relative to the gear driving it, since some longitudinal movement in the direction of the mutually engaging teeth is possible without the gears ceasing to function correctly.

3 Claims, 16 Drawing Sheets

U.S. PATENT DOCUMENTS 5,595,250 A * 1/1997 Bourke .................. 173/29

FOREIGN PATENT DOCUMENTS

| EP | 0 687 410 A1 | 12/1995 |
| EP | 1131994 A1 | 9/2001 |
| GB | 1 193 654 A | 6/1970 |
| GB | 2336987 A | 11/1999 |
| GB | 2384678 A | 8/2003 |
| GB | 2396580 | 6/2004 |
| JP | 2002058341 A | 2/2002 |

* cited by examiner

DRIVE MECHANISM FOR POWER TOOL

BACKGROUND OF THE INVENTION

The present invention relates to a drive mechanism for a power tool, and to a power tool incorporating such a mechanism. The invention relates particularly, but not exclusively, to a drive mechanism for a power tool for two-handed use such as a hedge trimmer, and to a hedge trimmer incorporating such a mechanism.

Hedge trimmers are power tools for general garden use with an axially reciprocating blade comprising a plurality of teeth disposed adjacent a stationary blade, the teeth of the stationary blade providing a reaction force for the teeth of the reciprocating blade.

Most hedge trimmers are powered by an electric motor housed such that the rotary output shaft of the motor lies along an axis parallel to the axis of reciprocation of the blade. The axis of rotation of the output shaft is therefore generally parallel to the axis of reciprocation of the blade in order to construct the hedge trimmer as compactly as possible. Consequently, it is necessary to convert rotation of the shaft into reciprocating movement parallel to the axis of rotation of the output shaft, in order to provide a driving input for the blade assembly.

A prior art drive mechanism for producing reciprocating motion in a direction parallel to an axis of rotation of a motor output shaft is shown in FIG. 1. A first bevel gear (20) comprises a plurality of teeth (21) inclined at 45° to an axis of rotation X-X. First bevel gear (20) is supported on shaft (22) and rotates in the direction shown by arrow (23). A second bevel gear (24) comprises a second plurality of teeth (25) inclined at 45° to axis of rotation Y-Y. The teeth (21) of the first bevel gear intermesh with the teeth (25) of the second bevel gear, and second bevel gear (24) is mounted on a shaft (26) such that second bevel gear (24) is free to rotate about axis Y-Y. Consequently, rotation of first bevel gear (20) about axis X-X causes second bevel gear (24) to rotate about axis Y-Y in the direction shown by arrow (27). In this way rotation of a gear about a first axis causes rotation of a further gear about a second axis perpendicular to said first axis.

This prior art drive mechanism suffers from the drawback that the 45° bevel gears must be very accurately machined and located relative to each other as the apex of the truncated cone formed by each gear must coincide. Producing gears having teeth arranged at 45° to the axis of rotation and correctly locating the gears in position relative to each other makes the drive mechanism and corresponding hedge trimmer expensive to produce.

Preferred embodiments of the present invention seek to overcome the above disadvantage of the prior art.

SUMMARY OF THE INVENTION

According to an aspect of the present invention, there is provided a drive mechanism for a power tool having a housing, a motor provided in the housing, and an output shaft adapted to be caused by said motor to execute reciprocating motion, the drive mechanism comprising:

a gear plate adapted to rotate about a first axis and having a plurality of elongate first teeth extending substantially in a plane perpendicular to said first axis; and connecting means cooperating with said gear plate and adapted to cause reciprocating movement of an output shaft of the tool in response to rotation of said gear plate about said first axis, wherein said reciprocating movement has a component perpendicular to said first axis.

By providing a gear plate and connecting means which provide a reciprocating drive force for an output shaft of a power tool with teeth formed at 90° to the axis of rotation of the gear, instead of teeth formed at 45° to the axis of rotation of the gear, this provides the advantage that the gear is cheaper and easier to make as the gear teeth do not have to be formed as accurately as prior art inclined gear teeth. Also, the gear plate does not need to be as accurately located relative to the gear driving it, since some longitudinal movement in the direction of the mutually engaging teeth is possible without the gears ceasing to function correctly.

Said first teeth may be provided at least adjacent a periphery of said gear plate.

This provides the advantage that the gear teeth do not have to cover the entire face of the gear plate, thereby further reducing production costs.

Said gear plate may have substantially circular cross section in the plane of said first teeth.

By providing radially extending teeth formed at the periphery of a circular gear plate, this provides the advantage that the teeth are almost parallel to one another at the periphery of the gear plate, and can therefore be easily engaged by a further set of parallel teeth.

According to another aspect of the present invention, there is provided a power tool comprising:

a housing;

a motor provided in the housing;

a drive mechanism as defined above;

a drive shaft cooperating with the motor and adapted to be rotated about a second axis substantially perpendicular to said first axis, wherein said drive shaft has a plurality of second teeth extending substantially parallel to said second axis and adapted to engage said first teeth such that rotation of said drive shaft about said second axis causes rotation of said gear plate about said first axis; and an output shaft cooperating with said drive mechanism.

By providing a drive shaft with a set of teeth formed parallel to a second axis, said second axis being substantially perpendicular to the axis of rotation of the gear plate and almost parallel to the teeth formed on the gear plate, this provides the advantage that both sets of teeth are formed almost parallel to the axis of rotation of the shaft and therefore intermesh linearly. Linearly intermeshing teeth do not have to be as accurately machined as angularly intermeshing teeth as the individual tooth edges are parallel to one another, and are therefore cheaper and easier to produce.

Said second teeth may be arranged adjacent an end of said drive shaft remote from the motor.

The power tool may be a hedge trimmer.

BRIEF DESCRIPTION OF THE DRAWINGS

Preferred embodiments of the present invention will now be described, by way of example only and not in any limitative sense, with reference to the accompanying drawings in which:

FIG. 10b is a top view of the gear conversion mechanism of FIG. 10a; and

DETAILED DESCRIPTION OF THE DRAWINGS

Figure 1:
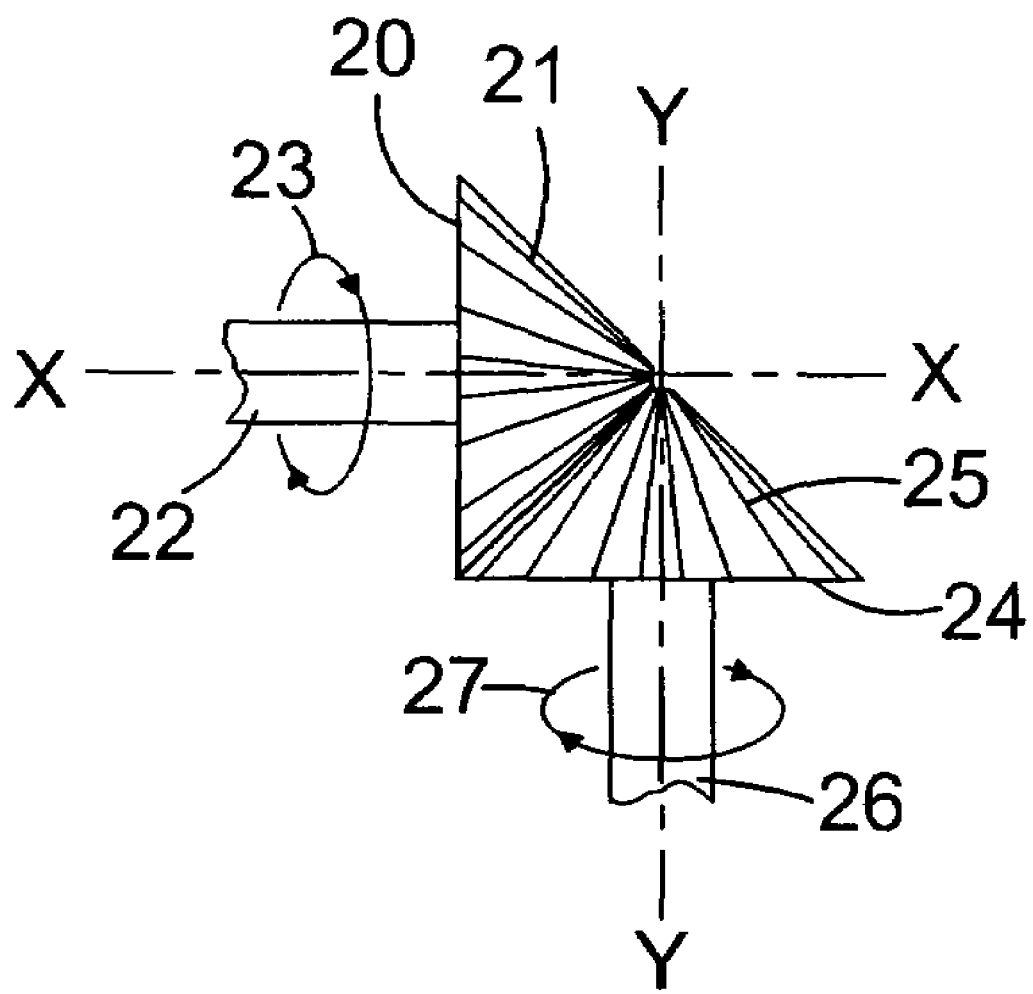
FIG. 1 is a side view of a prior art truncated conical bevel gear assembly for use in a hedge trimmer.
Figure 2:
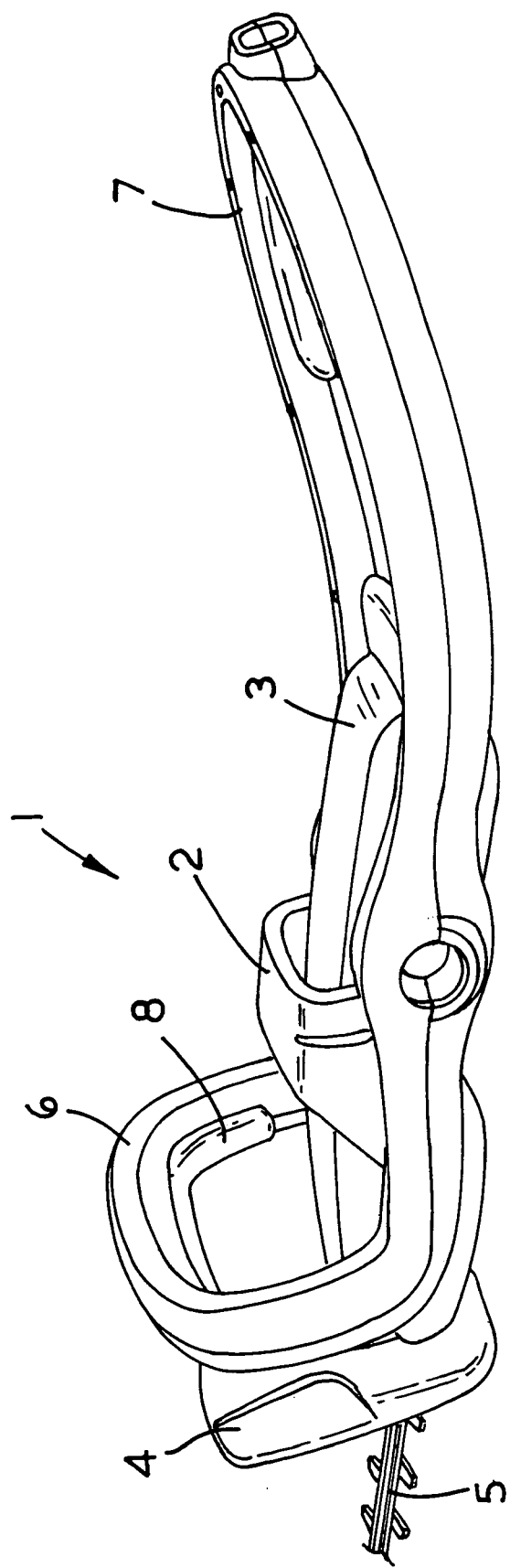
FIG. 2 is a perspective view from a first side of a hedge trimmer of a first embodiment of the present invention.

Referring to FIG. 2, a hedge trimmer (1) comprises a handle assembly (2) formed from durable plastics material pivotably connected to a housing (3). A guard (4) is formed integrally with the housing (3) and an electric motor (not shown) is disposed axially within the housing (3) such that the axis of rotation of an output shaft (not shown) of the motor is generally parallel to the direction of reciprocating motion of a blade assembly (5).

The blade assembly (5) extends forwardly of the housing (3). The electric motor (not shown) is connected to the blade assembly via a drive conversion mechanism, the operation of which will be described in further detail below. The blade assembly (5) comprises a stationary blade disposed adjacent to a blade adapted to execute reciprocating movement along a longitudinal axis of the stationary blade. In this way, the stationary blade provides a reaction force for the reciprocating blade to grip against and cut. The operation of this type of blade assembly is well known in the art and will not be described in any further detail herein.

The handle assembly (2) comprises a forward handle (6) and a rear handle (7). Both forward and rear handles (6), (7) are formed integrally from moulded durable plastics and enable a user to hold the hedge trimmer in a variety of ways. As is well known in the art, it is desirable for certain power tools such as chainsaws, hedge trimmers and circular saws to have two handles for the user to grip, one with either hand. A two-handle assembly has two advantages. Firstly, when the tool is gripped in both hands it is more stable in the user's hands and therefore easier to control, which enables more accurate and precise cutting. Secondly, a two-handed grip on the hedge trimmer is a lot safer than a single handed grip. It is a lot easier for a user to lose control of a hedge trimmer when gripping it with only one hand.

Figure 3:
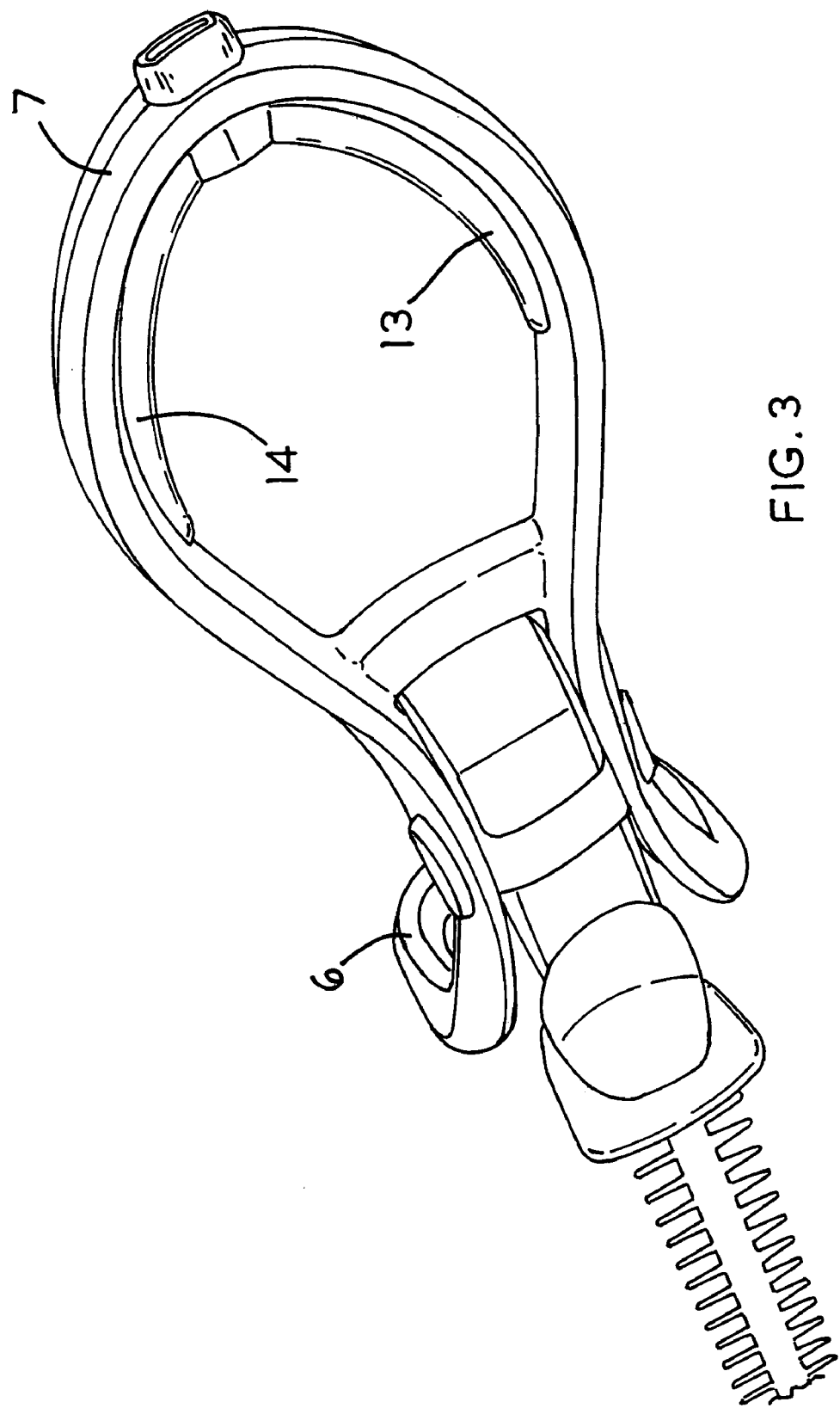
FIG. 3 is a perspective view from below of the hedge trimmer of FIG. 2.

The hedge trimmer is provided with a dual switching mechanism. In order to activate the hedge trimmer, the user must simultaneously depress a forward switch (8) and either one of rear switches (13), (14), as shown in FIG. 3. As a result, it is impossible for the user to activate the hedge trimmer without first gripping it with both hands.

Figure 4:
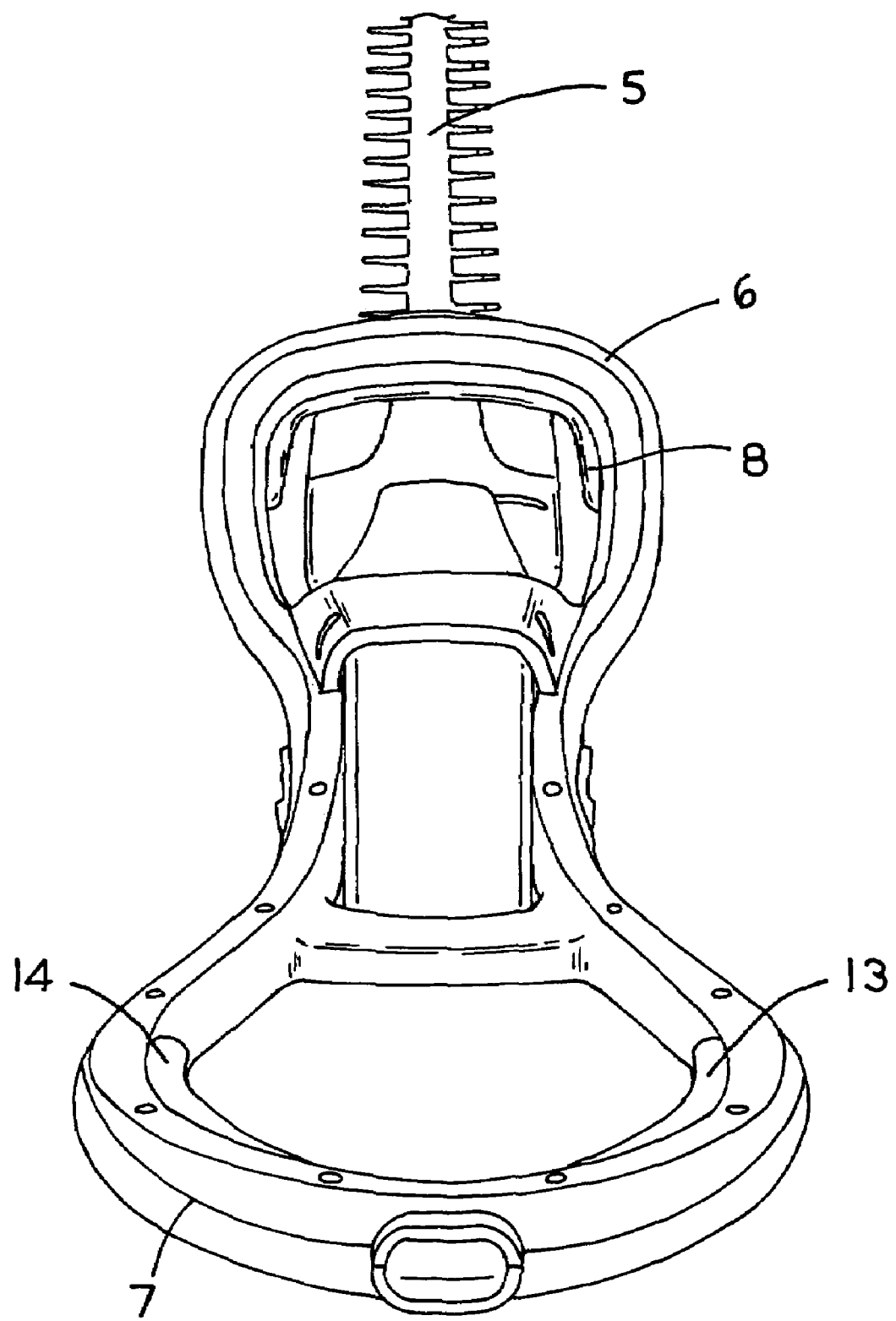
FIG. 4 is a rear perspective view of the hedge trimmer of FIG. 2.

It is desirable when operating a hedge trimmer with the blade in the vertical plane for the user to be able to grip the hedge trimmer without twisting either wrist at an angle relative to the other. Referring to FIG. 4, the present invention provides a handle assembly which allows a left-handed user and a right-handed user to operate the hedge trimmer in any orientation with the wrists of each arm aligned, i.e. with the wrists arranged along parallel axes. For example, the right-handed user would grip forward handle (6) with his left hand such that the fingers of his left hand pass around the front of forward handle (6) and grip switch (8) with the fingertips of his left hand. The right-handed user would place his right hand around rear handle (7) such that the fingertips of his right hand grip switch (13). It can be seen that in this orientation the right-handed user holds the hedge trimmer such that the insides of his wrists are facing each other and his wrists are aligned in planes generally parallel to the plane of the blade. The same can be said of the left-handed user. However the left-handed user would grip forward handle (6) with his right hand and rear handle (7) with his left hand such that the fingertips of his left hand are in a position to depress switch (14).

This feature of the present invention offers several advantages over the prior art. Firstly, holding the hedge trimmer without a twist in the user's arm is more comfortable, and affords the user more control over the hedge trimmer blade. Secondly, prior art hedge trimmers must be held with a twist in the user's arm. Over prolonged periods of use, the user's arms may tire, and apply an unwanted torque to the hedge trimmer as the muscles of the user's forearms attempt to orientate themselves into a more comfortable position. This makes it more difficult to accurately cut with the hedge trimmer.

Figure 5:
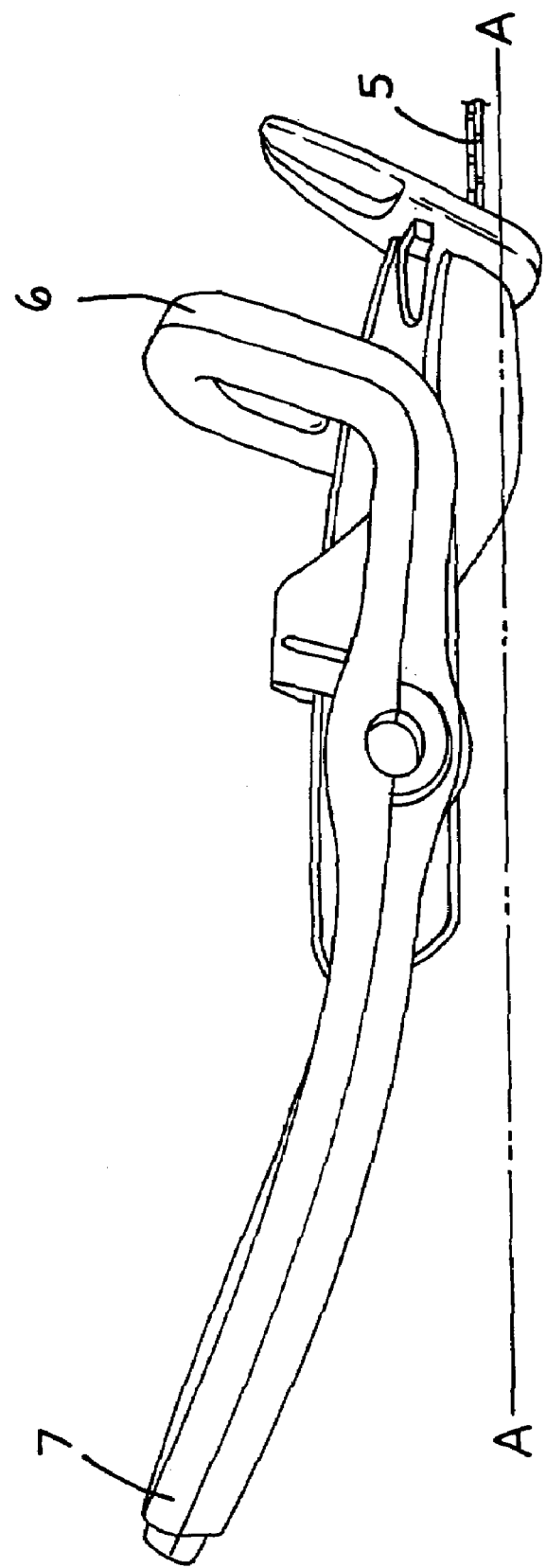
FIG. 5 is a side perspective view of the hedge trimmer of FIG. 2, from the opposite side as that shown in FIG. 2.

Referring to FIG. 5, line A-A represents the plane of blade assembly (5). The plane of rear handle (7) is at an angle to line A-A such that the rear part of rear handle (7) is raised substantially away from the plane of blade (5). As a result of this, the knuckles of the hand of the user that is gripping rear handle (7) are raised away from the surface of the hedge being cut. This provides the advantage that the user's knuckles avoid any grazing or cutting resulting from contact with the hedge, or with the ground when carrying out low cutting.

Figure 6:
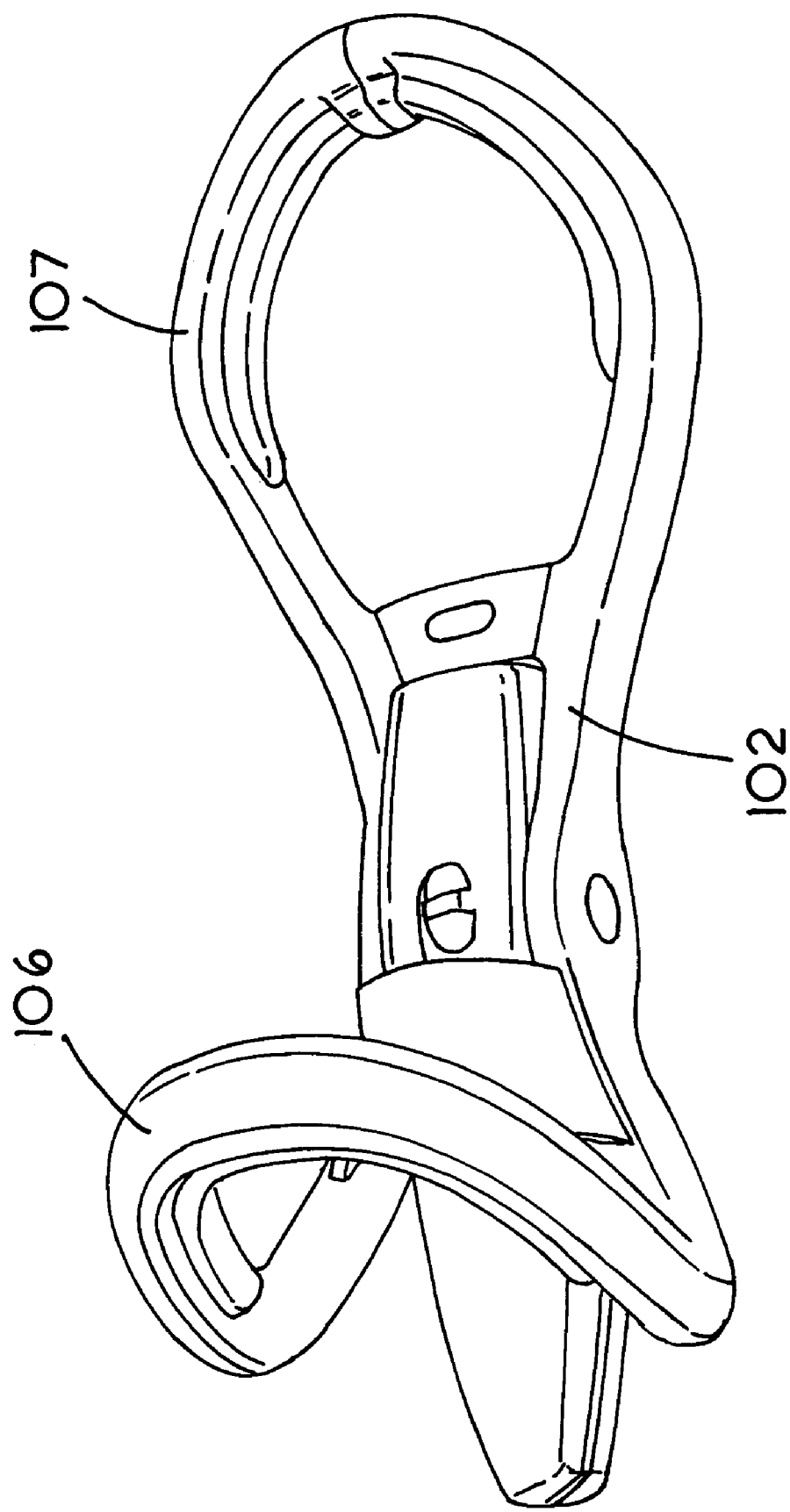
FIG. 6 is a perspective view from above of a hedge trimmer of a second embodiment of the present invention.
Figure 7:
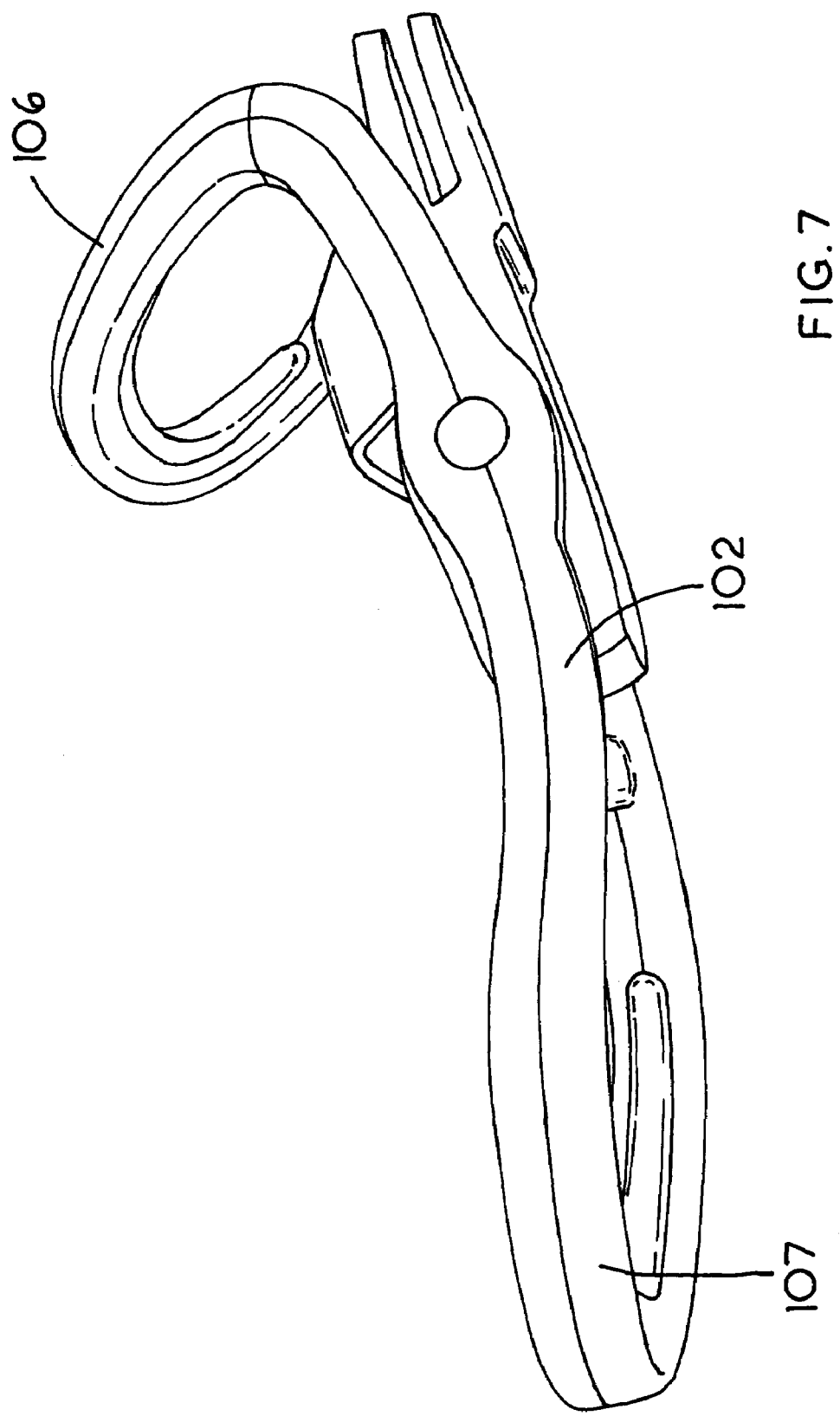
FIG. 7 is a side perspective view of the handle assembly and body of the hedge trimmer of FIG. 6.

Referring to FIGS. 6 and 7, in which parts common to the embodiment of FIGS. 2 to 5 are denoted by like reference numerals but increased by 100, a second embodiment of the handle assembly (102) is shown. It can be seen that front handle (106) is swept back at a greater angle relative to the plane of the blade compared with the angle of front handle (6) relative to the plane of blade (5) as shown in FIG. 5. This feature makes the hedge trimmer more comfortable for the user to operate provided that the centre of mass of the hedge trimmer lies in the region between front handle (106) and rear handle (107) which will usually be the case, since the heaviest parts of the hedge trimmer are generally the blade and the motor housing. The user does not have to stretch his forward arm as far relative to the rear handle as he would do when using the handle assembly shown in FIG. 5.

It is therefore desirable to have the rear handle located as far away from the centre of mass as is possible. Since the two heaviest components of a hedge trimmer are generally the electric motor disposed in the housing and the forward blade assembly, the centre of mass of the hedge trimmer generally lies between the motor and the blade.

In order to make the hedge trimmer easier to manipulate, it is desirable to locate the rear handle (7), (107) as far away from the centre of mass as possible. This is because the further away the rear handle is from the centre of mass, the less force is needed to be applied to the rear handle to apply the same torque to the hedge trimmer. One way of achieving this is to make the rear handle as large as possible without increasing the weight of the rear handle, and for this reason the rear handle (7), (107) of the hedge trimmer is formed into the curved bar loop shape with a space enclosed as is best shown in FIG. 2 or in FIG. 6.

The handle assembly (7) of the present invention enables the user to operate the hedge trimmer for cutting a horizontal surface such that the wrists of the user's arms are oriented generally parallel to one another. Also, as described above, when the blade is required to be operated in the vertical plane, the user can operate the hedge trimmer with his wrists arranged in generally parallel vertical planes.

A problem can arise with prior art hedge trimmers when a horizontal surface to be cut is high up relative to the user such as the horizontal upper surface of a tall hedge, as the user may have to stretch and hold the hedge trimmer above his head. This is undesirable for the user especially when the user is on stepladders or other apparatus to raise the user from the ground. When the user is holding the hedge trimmer high up relative to his body or even holding the hedge trimmer above his head in order to cut a horizontal surface, the user is less stable than he would be were he operating the hedge trimmer further down relative to his body. Furthermore, although hedge trimmers can generally be operated upside down, it has been found that consumers are generally very reluctant to operate hedge trimmers upside down whilst held above the head.

Figure 8:
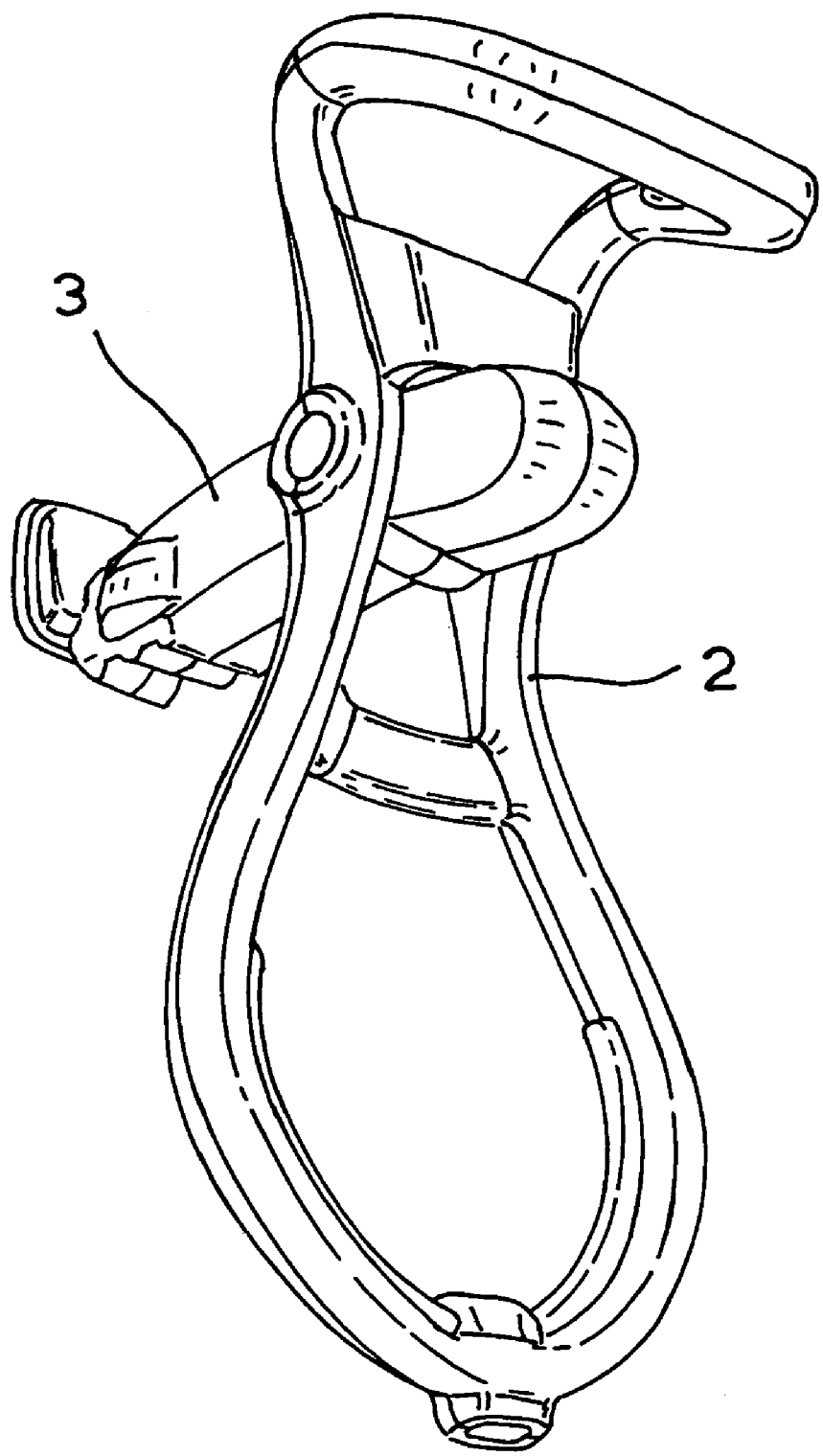
FIG. 8 is a side and rear perspective view of the handle assembly and body rear of the hedge trimmer of the present invention with the body portion tilted at an angle to the handle assembly.
Figure 9:
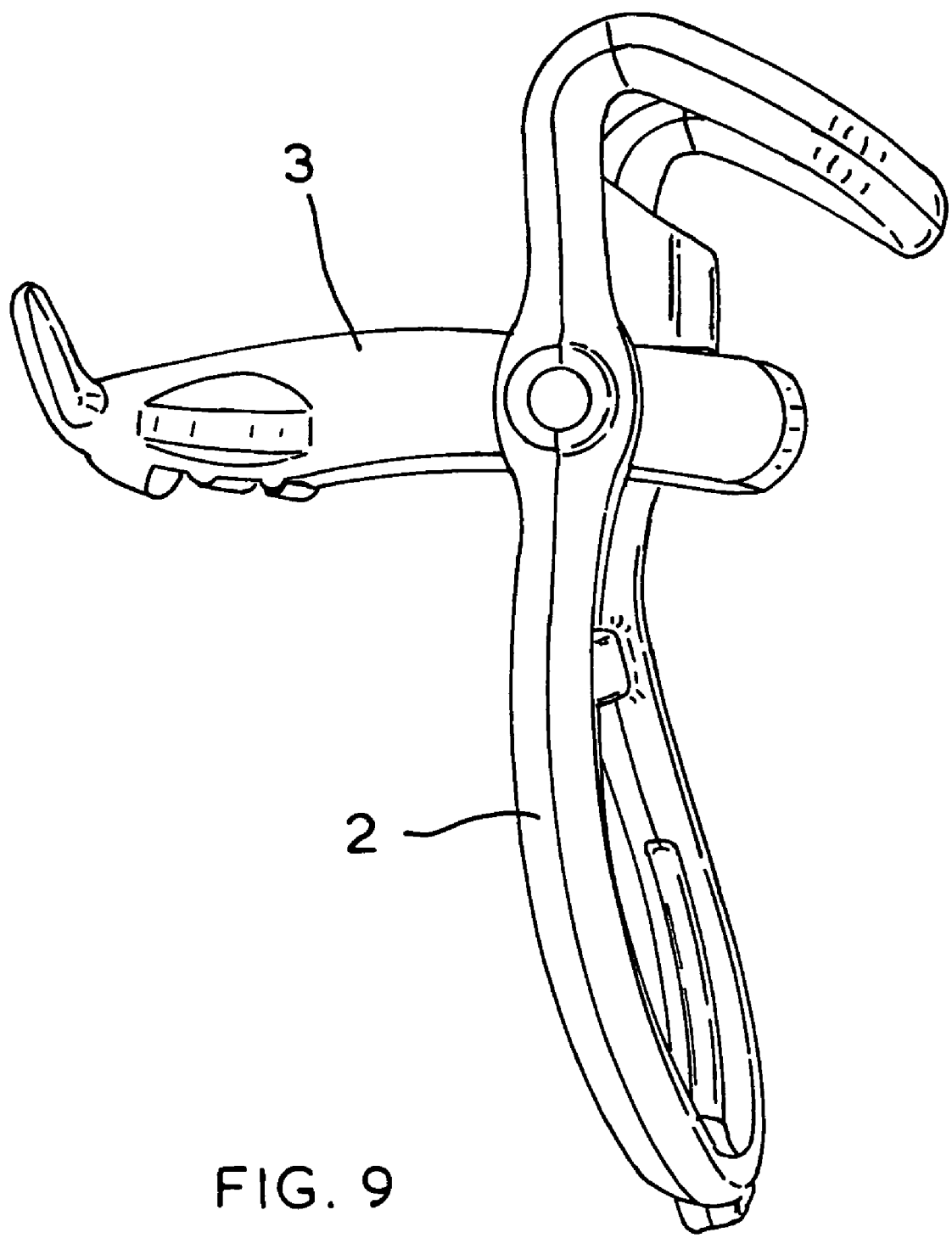
FIG. 9 is a further side perspective view of the hedge trimmer of FIG. 8.

Referring to FIGS. 8 and 9, the hedge trimmer is shown without the forwardly projecting blade where the body housing (3) has been pivoted relative to the handle assembly (2). In this orientation, the hedge trimmer is operated in exactly the same way as before, with the user gripping both forward and rear handles and depressing forward and rear switches respectively. This feature makes it easier for the user to view along the plane of the blade when cutting the top of a tall hedge, and more comfortable for horizontal cutting in a position high up relative to the user's body. This is because instead of the user having to hold the handles horizontally at eye level as with prior art hedge trimmers, the user can now hold the handle assembly in front of his body whilst looking along the plane of the blade.

Figure 16A:
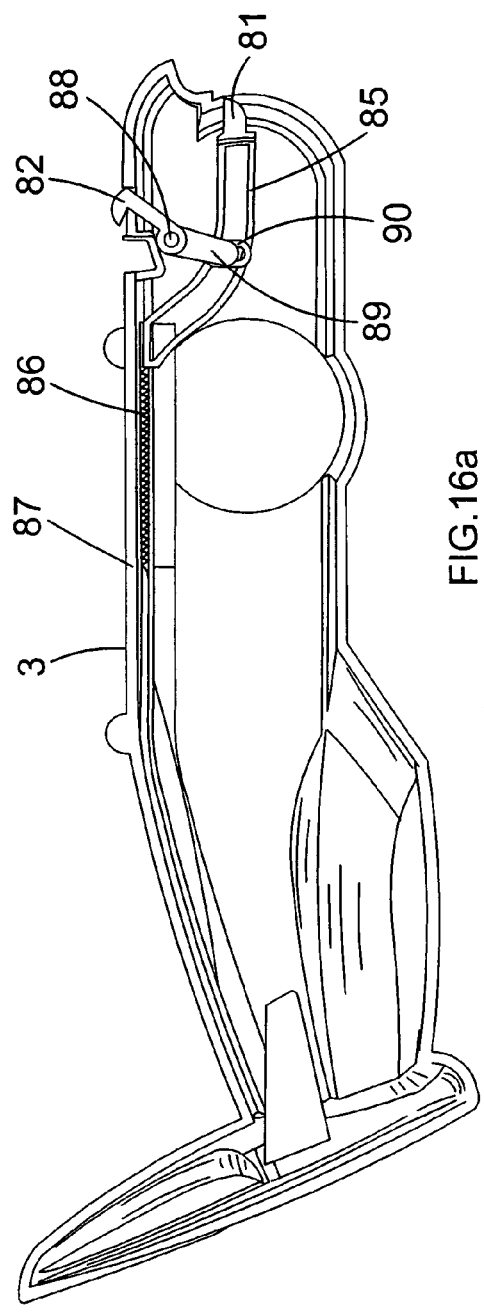
FIG. 16a is a cross sectional side view of the hedge trimmer housing with the latch mechanism in the open position.
Figure 16B:
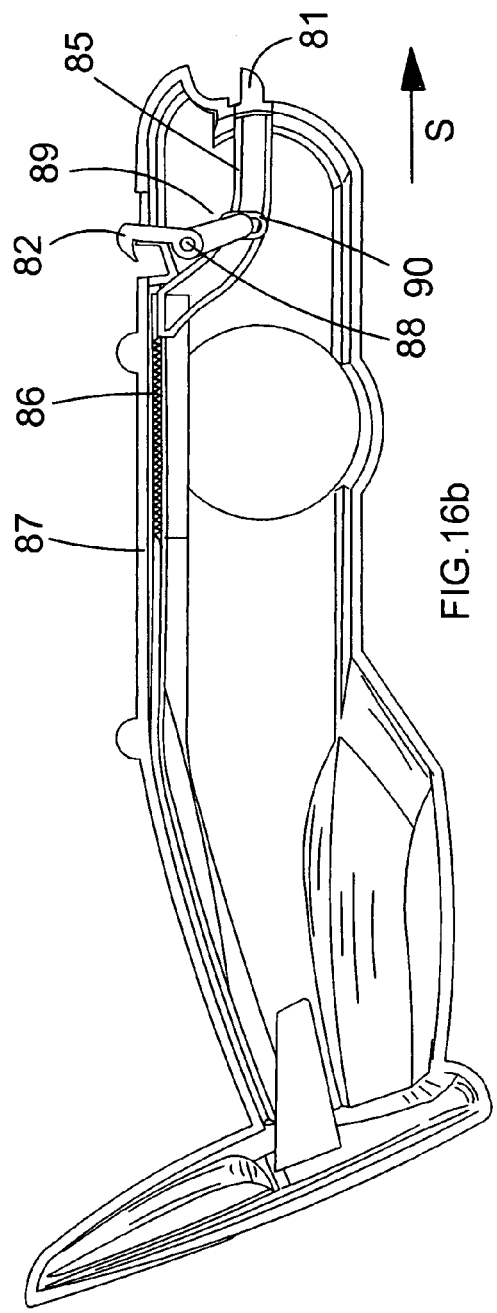
FIG. 16b is a cross sectional side view of the hedge trimmer housing of FIG. 17a with the latch mechanism in the closed position.

Referring to FIGS. 16*a* and 16*b*, the operation of the latch mechanism for holding the hedge trimmer in either of the orientations described above will now be described.

A first retaining member (81) is mounted at a first end of a bracket (85), and the other end of bracket (85) is mounted on a compression spring (86). Compression spring (86) is fixed to the body of the hedge trimmer housing at (87). A second retaining member (82) is able to pivot about a pin (88), pin (88) being fixed relative to the housing (3). Second retaining member (82) is also rigidly fixed to a first end of a lever (89), the second end of lever (89) being slidable in a second bracket (90), second bracket (90) being formed in first bracket (85).

When the first bracket (85) is moved in the direction of arrow S from the configuration shown in FIG. 16*a* to the configuration of FIG. 16*b* as a result of compression spring (86) extending, it can be seen that firstly the first retaining member (81) is pushed out of the back of the housing (3). Secondly, as a result of lever (89) sliding upwardly in second bracket (90), the second retaining member (82) is pivoted about pin (88) and out of housing (3).

In the configuration of FIG. 16*b*, either the first or second retaining means (81, 82) will engage with a corresponding portion of the handle assembly (not shown), and a user would release the mechanism simply by pushing the retaining member which is not in engagement with the handle assembly back into the housing, as this action would also result in retracting the other retaining member from engagement with the handle assembly.

Figure 17A:
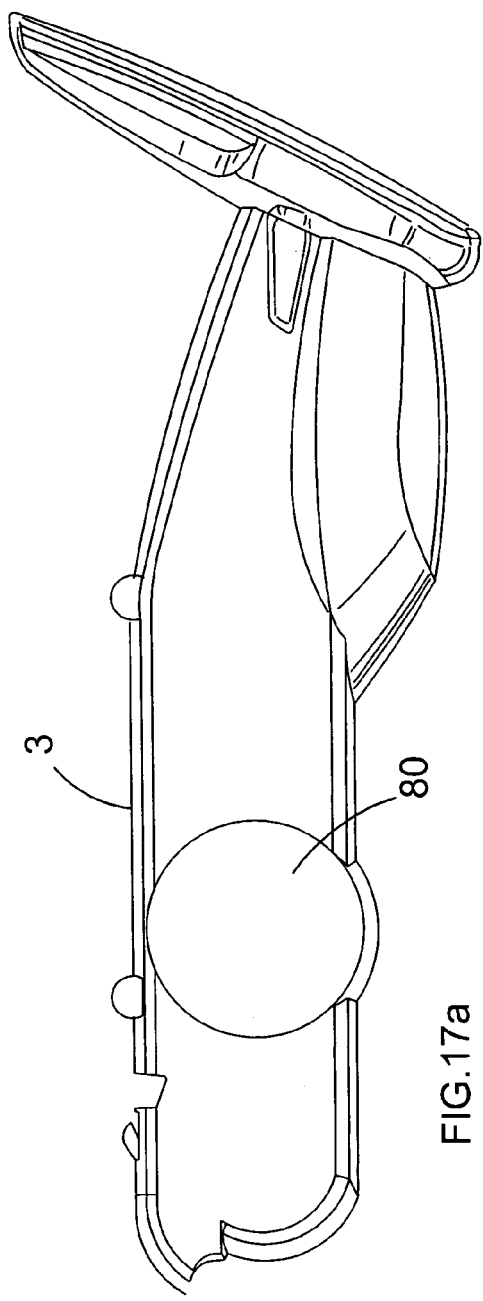
FIG. 17a is a side view of the hedge trimmer housing, with the latch mechanism in the open position.
Figure 17B:
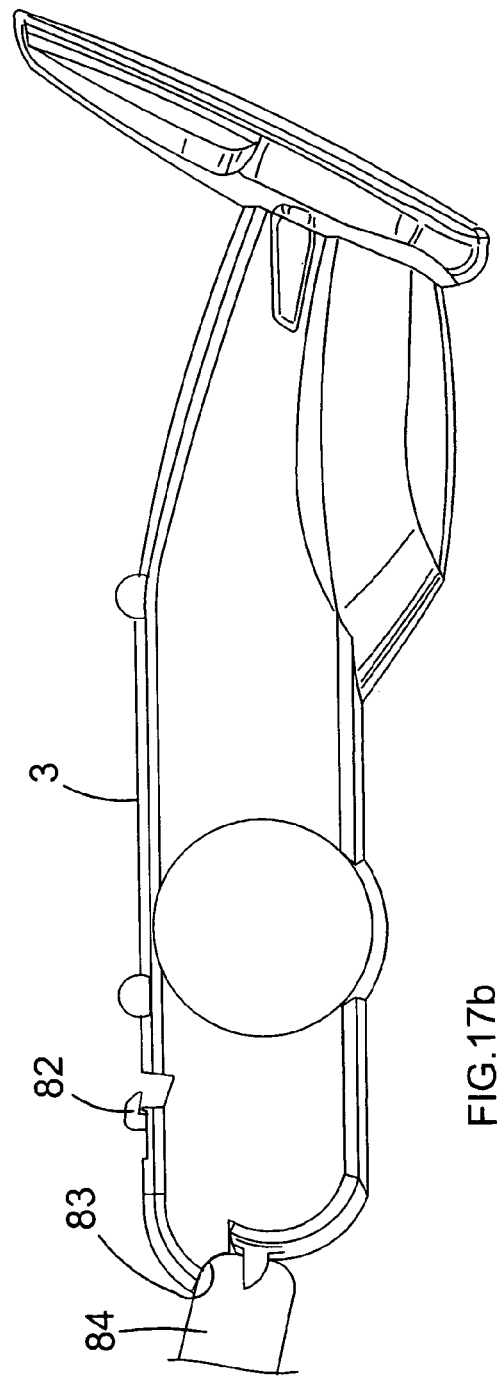
FIG. 17b is a side view of the hedge trimmer housing of FIG. 16a, with the latch mechanism in the closed position and engaging the hedge trimmer handle assembly.

Referring to FIGS. 17*a* and 17*b*, the hedge trimmer housing (3) engages the hedge trimmer handle assembly at a cylindrical pivot (80) such that the housing (3) can rotate about pivot portion (80). The hedge trimmer can be operated in two separate orientations, the in-line orientation as shown in FIG. 2, or the orientation shown in FIGS. 8 and 9 where the hedge trimmer housing (3) is rotated through 90° relative to the hedge trimmer handle assembly (2).

In order to retain the hedge trimmer housing (3) in position relative to the handle assembly (not shown), the housing (3) is provided with a first retaining member (81) and a second retaining member (82). Both first and second retaining members (81, 82) are retractable relative to the housing (3), and are shown in their respective retracted positions in FIG. 17*a*. The rear end of housing (3) has an integrally formed abutment surface (83) shaped to receive an engaging portion (84) of handle assembly (2). It can be seen that the engaging portion (84) of the handle assembly is received between abutment surface (83) of the housing (3) and the first retaining member (81) such that the engaging portion (84) can not move in either the upwards or downwards direction relative to housing (3). The first retaining member (81) is so shaped that the engaging portion (84) can slide into engagement with abutment surface (83) by displacing retaining member (81), but cannot move out of engagement with abutment surface (83) until retaining member (81) is retracted into the housing (3).

When the hedge trimmer is used in the orientation shown in FIGS. 8 and 9, second retaining member (82) grips a second engaging portion (not shown) of the handle assembly, and in this orientation even though first retaining member (81) is deployed, it is not in use. In order to release the latch mechanism, either first or second retaining members (81, 82) can be depressed by the user, depending on which one is not in engagement with the handle assembly, which simultaneously moves both first and second retaining members (81, 82) into the housing.

Figure 13:
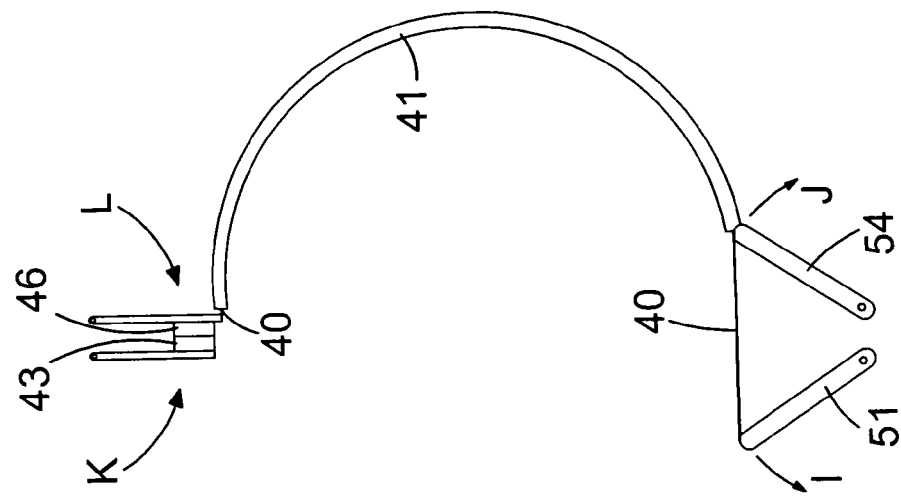
FIG. 13 is a schematic view of the switching mechanism of FIG. 12 in the closed position.
Figure 12:
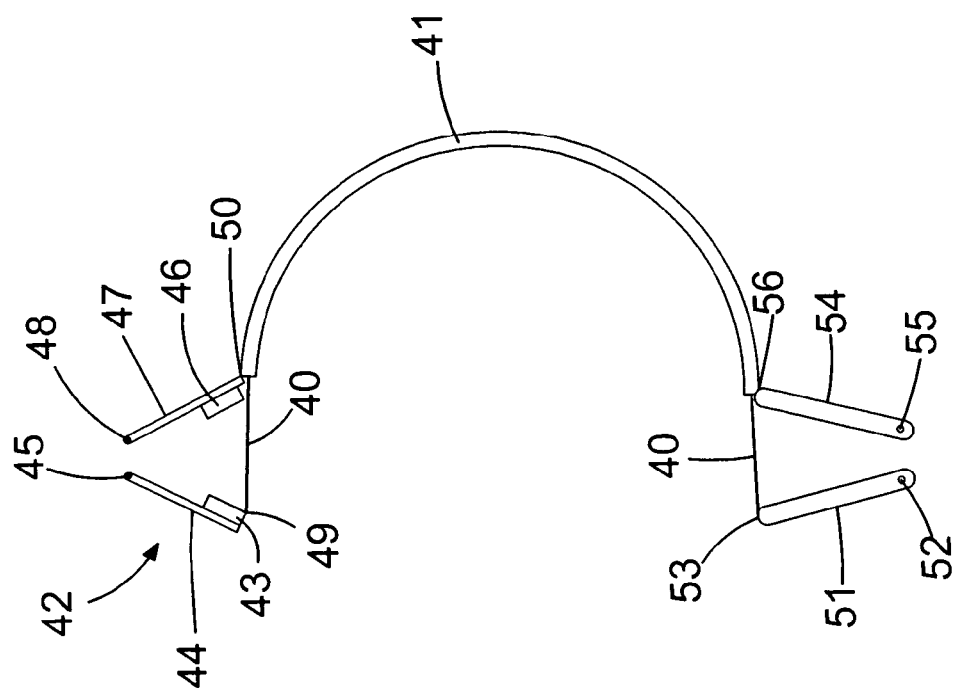
FIG. 12 is a schematic view of a switching mechanism of the present invention in the open position.

Referring to FIGS. 12 and 13, the dual switching mechanism of the present invention will now be described.

A bowden cable, such as that used to operate the brakes on a pedal bicycle, consists of an inner cable (40) surrounded by an outer sheath (41). The inner cable (40) passes through the outer cable (41) and is slidable relative thereto. An electrical contact shown generally by (42) comprises a first metallic pad (43) mounted on an arm (44), the arm being pivotable about point (45) and a second metallic pad (46) mounted on a second arm (47), the second arm being pivotable about point 48 such that metallic pads (43) and (46) can be pivoted towards each other, and into contact.

A first end of inner cable (40) is attached to metallic pad (43) at point (49), and a first end of outer cable (41) is attached to arm (47) at point (50).

A first switch (51) comprises an arm that is pivotable about point (52), the arm being attached to a second end of inner cable (40) at point (53). A second switch (54) is pivotable about point (55) and is attached to the outer cable at point (56).

Referring to FIG. 13, first switch (51) and second switch (54) are operated by a user applying pressure and pivoting them away from each other in the direction shown by arrows I and J. As first switch (51) is rigidly attached to the inner cable (40), and second switch (54) is rigidly attached to the outer cable (41), the pivoting motion of the switches in opposite directions draws the inner cable (40) through outer cable (41), whilst at the same time second switch (54) pushes outer cable (41) around inner cable (40). As a result of this, inner cable (40) pulls first metallic pad (43) in the direction of arrow K, and outer cable (41) pushes the second metallic pad (46) in the direction of arrow L such that pads (43), (46) come into contact.

It can be seen then that if only one switch, either (51) or (54), is moved whilst the other switch remains in the open position, the resulting movement of the bowden cable would only consist of independent movement of either the inner (40) or outer cable (41) such that the contact would only be half closed, as only one metallic pad would be moved into a contacting position.

It should also be appreciated that further embodiments of a switching mechanism of this type are possible with more than two switches. For example, a single inner cable (40) can be provided with a plurality of outer sheaths (41), each outer sheath moving independently of one another which provides the option of adding more switches and/or electrical contacts. It should also be noted that in practice, taking the example of a two switch mechanism, the mechanism will be set up such that closing one switch will have the result of partially closing the contact by more than half the distance required to fully close the contact, and closing the second switch will also have the result of more than half closing the contact. In this way, it is ensured that the contact will actually be closed when both switches are closed.

It should also be appreciated that FIGS. 12 and 13 are only a schematic representation of the switching mechanism, and in practise the contacts be in the form of something other than pivoting metallic pads, as will be described below.

Referring to FIGS. 14a to 15c, the operation of the pivoting switching mechanism will now be described.

Figure 14A:
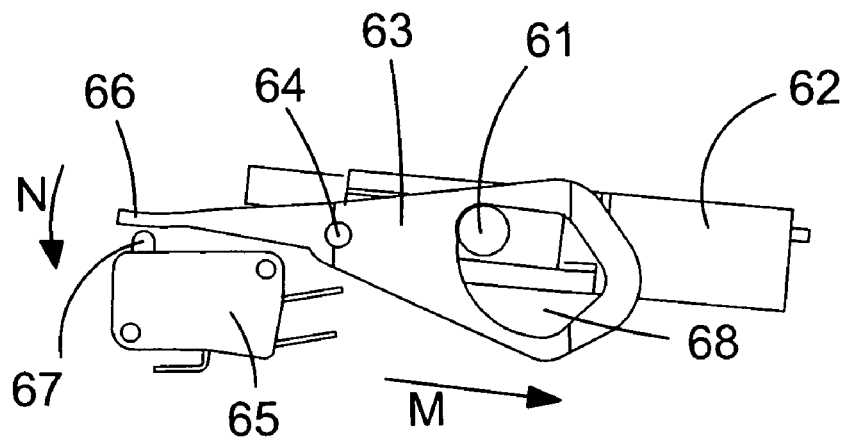
FIG. 14a is a side view of the switching mechanism and relay of the present invention in the open position where the handle assembly is in the horizontal orientation relative to the housing.

Referring to FIG. 14a, a pin (61) is held in a pin housing (62) which is disposed in the hedge trimmer handle assembly (not shown). The pin (61) and pin housing (62) are slidable relative to the hedge trimmer handle assembly (not shown) in the direction of arrow M. Pin (61) projects outwardly from housing (62) and is received in an aperture (68) formed in an arm member (63). Arm member (63) is mounted to the hedge trimmer body housing (not shown) by a pin (64). Arm member (63) is pivotable about pin (64) in the direction of arrow N relative to the hedge trimmer housing (not shown). An electrical relay (65) is disposed in the hedge trimmer housing (not shown) such that when arm (63) is pivoted in the direction of arrow N, a remote end (66) of arm (63) depresses a switch (67) and closes relay (65).

Figure 14B:
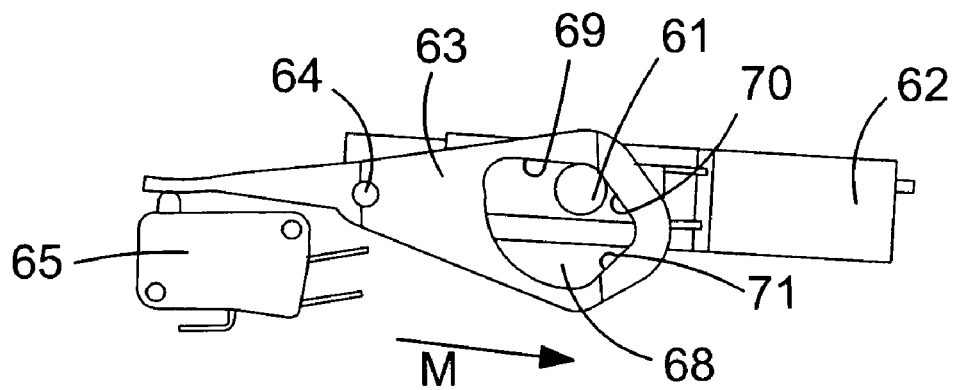
FIG. 14b is a side view of the switching mechanism of FIG. 14A in the partially closed position.
Figure 14C:
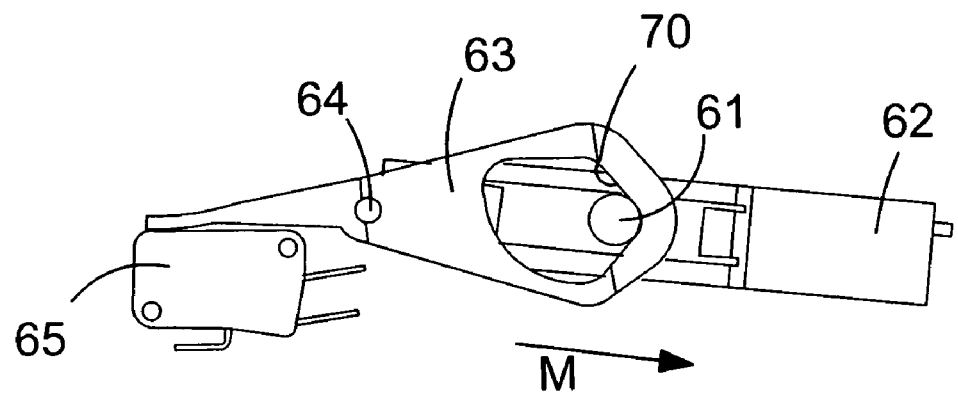
FIG. 14c is a side view of the switching mechanism and relay of FIG. 14A in which the relay is closed.

Referring now to FIG. 14b, when a first switch (not shown), is depressed by the user, a cable (not shown) causes pin (61) to slide in the direction of arrow M along cam surface (69) provided in aperture (68). It can be seen, however, that the movement of pin (61) is insufficient to cause arm member (63) to pivot about pin (64) and close relay (65). Referring now to FIG. 14c, in order to close the relay, the user must depress a second switch (not shown) provided on the handle assembly, which causes pin (61) to slide a further distance in the direction of arrow M along a second cam surface (70), provided in aperture (68), causing arm member (63) to pivot about point (64) and close the relay (65).

It can therefore be seen that in order to close the relay (65), a user must depress both first and second hedge trimmer switches, which in the embodiment of the hedge trimmer shown in FIG. 4 for example, would be switch (8) formed on front handle (6) and either one of switches (13), (14) formed on rear handle (7).

Figure 15A:
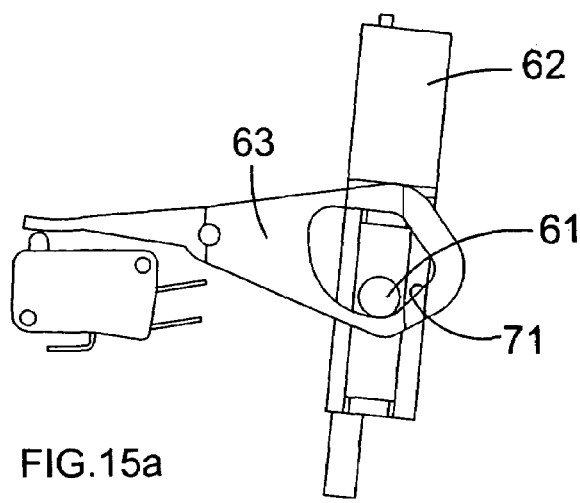
FIG. 15a is a side view of the switching mechanism of FIG. 14A in which the handle assembly is rotated through 90° relative to the housing and the switch and relay are in the open position.

Referring to FIG. 8, the hedge trimmer body housing (3) can be pivoted at 90° relative to the handle assembly (2). Referring now to FIG. 15a, the pin housing (62) is rotated through 90° from the position shown in FIG. 14a. Pin (61) now abuts third cam surface (71), and as the hedge trimmer housing has remained stationary, arm member (63) remains in the same position.

Figure 15B:
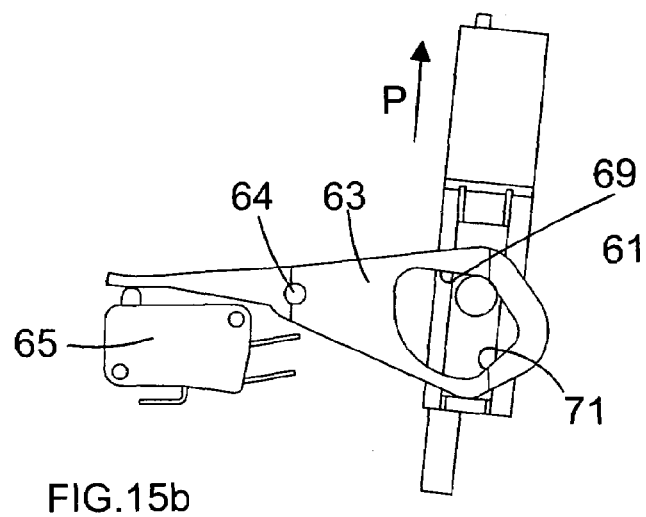
FIG. 15b is a side view of the switching mechanism of FIG. 15A in the partially closed position.

Referring now to FIG. 15b, when a user depresses a first switch (not shown), in the same way as shown in FIG. 14b except at 90° to FIG. 14b, pin (61) moves through a first distance in the direction of arrow P from cam surface (71) to cam surface (69). It can be seen however, that pin (61) has not moved sufficiently to pivot arm (63) about pin (64) to close relay (65).

Figure 15C:
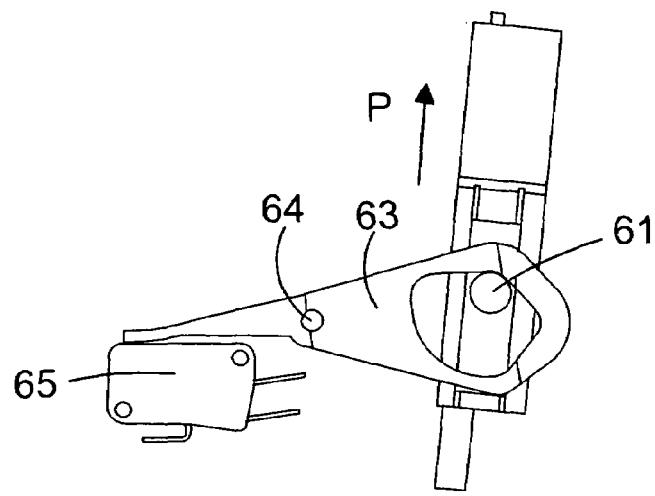
FIG. 15c is a side view of the switching mechanism of FIG. 15A in which the relay is closed.

Referring now to FIG. 15c, in order to close relay (65), the user must depress a second switch (not shown) which further moves pin (61) in the direction of arrow P thus pivoting arm (63) about pin (64) and completing the closure of relay (65).

Figure 11:
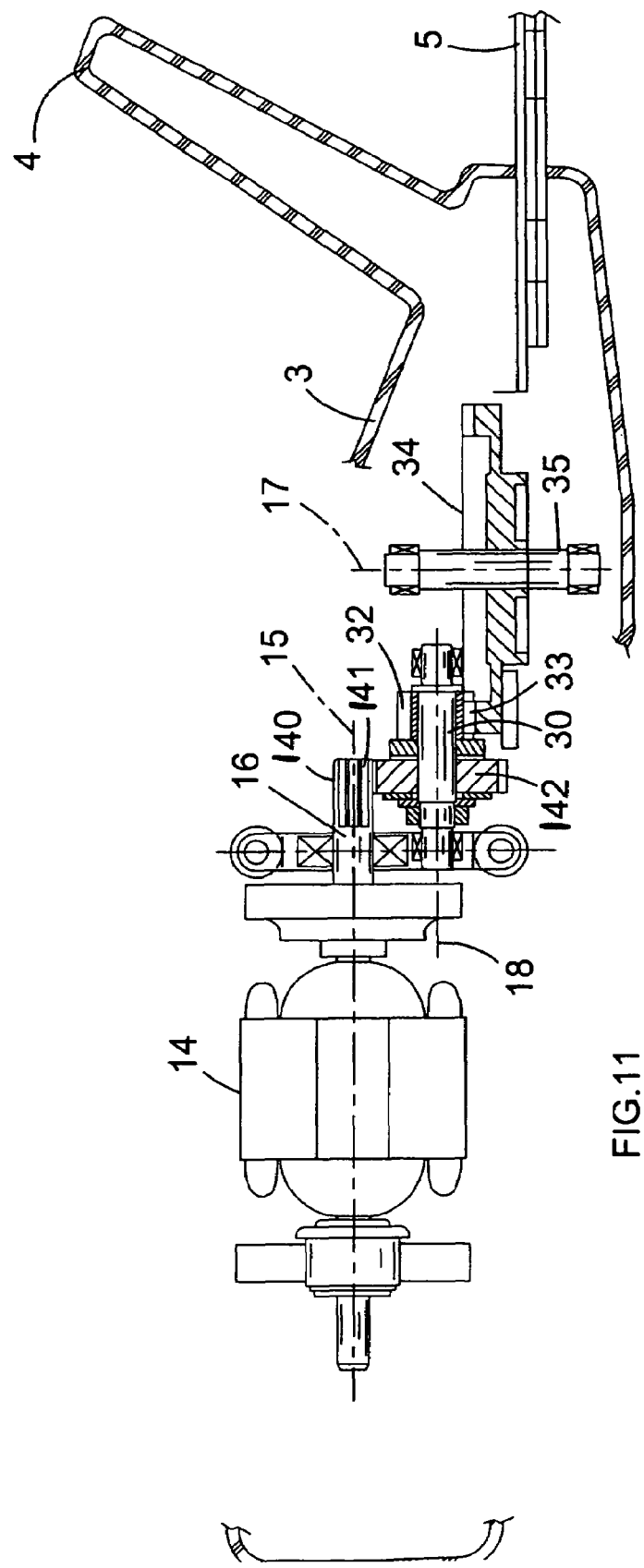
FIG. 11 is a side cross sectional view of the housing of a hedge trimmer incorporating the gear conversion mechanism of FIGS. 10a and 10b.

Referring now to FIG. 11, an electric motor (14) is disposed axially in housing (3), such that the axis of rotation (15) of the motor output shaft (16) is parallel to the plane of blade (5). It can be seen therefore that in order to drive the blade mechanism, the direction of rotation about axis (15) needs to be converted through 90° into rotation about axis (17).

Figure 10A:
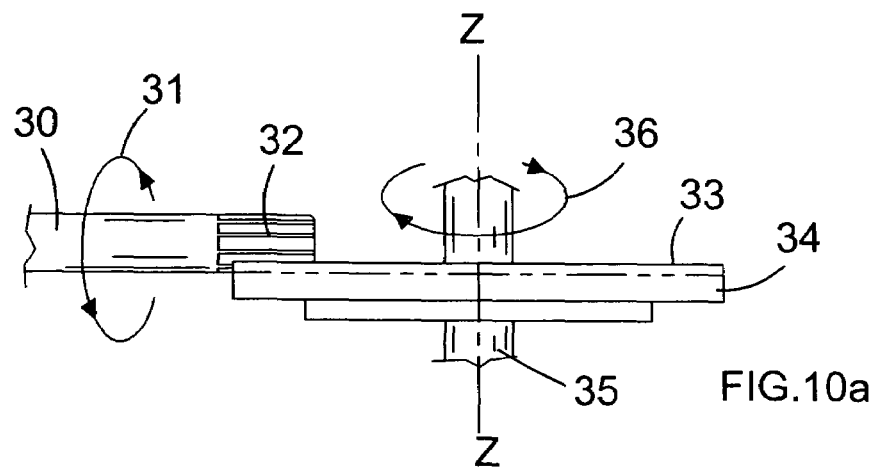
FIG. 10a is a cross sectional side view of the gear conversion mechanism of the present invention.
Figure 10B:
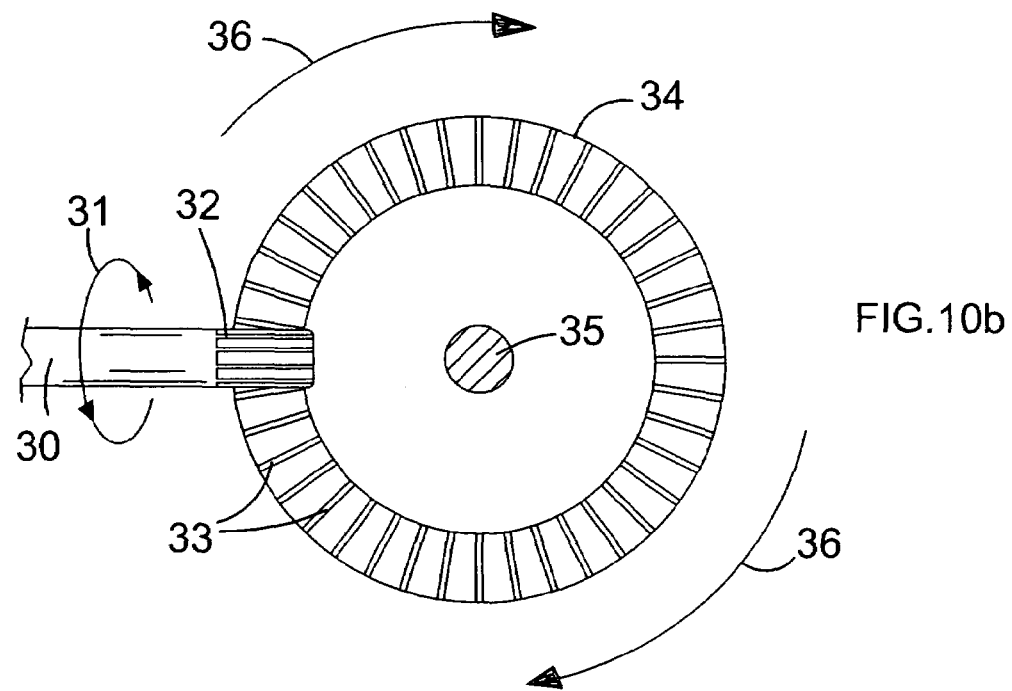

As shown in FIGS. 10a and 10b, the drive convesion mechanism of the present invention for converting rotation about a first axis to rotation about a second axis comprises a shaft (30) rotating in the direction of arrow (31). A plurality of axially aligned parallel teeth (32) are formed at the end of shaft (30). Parallel teeth (32) intermesh with second plurality of radial teeth (33) formed on the upper surface of a gear plate (34). Gear plate (34) is mounted on a second shaft (35) such that gear plate (34) is free to rotate about an axis Z-Z. As a result of this, the rotation of shaft (30) imparts rotation to second shaft (35) in the direction of arrow (36) due to the reaction between teeth (32) and teeth (33).

This method of converting rotation about a first axis into rotation about a second axis generally perpendicular to said first axis is substantially cheaper to manufacture than prior art methods, as the engineering tolerances between teeth (32) and shaft (30) and teeth (33) on the gear plate (34) can be less than those needed to be achieved with the conical gears of the prior art drive mechanisms.

Referring again to FIG. 11, the incorporation of the drive conversion mechanism of FIGS. 10*a* and 10*b* into the hedge trimmer of the present invention will now be described.

An electric motor drives a rotary output shaft (16) adapted to rotate about axis (15). A plurality of teeth (140) are formed on the edge of shaft (16) and intermesh with a second plurality of teeth (141) formed on a gear (142). Gear (142) is adapted to rotate about axis (18) which is parallel to axis (15), and as gear (142) comprises a larger number of teeth (141) than the number of teeth (140) formed on output shaft (16), the rotational speed of gear (142) is less than that of output shaft (16). Gear (142) is mounted on a shaft (30) which has a further set of teeth (32) formed around the edge of shaft (30). Teeth (32) intermesh with a plurality of radial teeth (33) formed on the upper surface of a gear plate (34). Gear plate (34) is mounted on shaft (35) and adapted to rotate about axis (17) such that the rotation of shaft (30) about axis (18) is converted to rotation about axis (17) generally perpendicular to axis (18).

It can therefore be seen that the teeth on shaft (30) can still drive gear plate (34) despite variations in position between the shaft and the gear plate, provided the teeth on the shaft still engage the teeth on the gear plate. The shaft and gear plate therefore do not need to be as accurately located relative to each other as the bevel gears of the prior art.

It can also be seen that the inline rotation of the motor output shaft (16) is converted into rotation in the plane of blade (5). The blade (5) is connected to gear plate (34) via a drive conversion mechanism for converting rotary motion about axis (17) into linear reciprocating motion perpendicular to axis (17) in a manner which will be familiar to persons skilled in the art, such as a scotch yoke mechanism. Mechanisms of this type are well known in the art and will not be described herein in any further detail.

It will be appreciated by persons skilled in the art that the above embodiments have been described by way of example only and not in any limitative sense, and that various alterations and modification are possible without departure from the scope of the invention as defined by the appended claims.

The invention claimed is:

1. A hedge trimmer comprising;
    a housing, a motor in the housing, and a drive mechanism, the drive mechanism comprising;
    a gear plate adapted to rotate about a first axis and having a plurality of elongate first teeth substantially in a plane perpendicular to the first axis and extending in a straight line radially outward from the first axis, the gear plate connected to a blade assembly and causing the blade assembly to move in a linear reciprocal motion;
    a drive shaft driven by the motor, the drive shaft having a second axis of rotation perpendicular to the first axis of rotation, the drive shaft having a plurality of second teeth extending parallel to the second axis and engaging the first teeth such that rotation of the drive shaft causes rotation of the gear plate; and
    wherein the motor drives a rotary output shaft having a plurality of teeth for intermeshing with a plurality of teeth formed on a gear which is mounted on the drive shaft.

2. A hedge trimmer of claim 1, wherein an axis of rotation of the rotary output shaft is parallel to the second axis of rotation.

3. A hedge trimmer of claim 1, wherein an axis of rotation of the rotary output shaft is parallel to the longitudinal direction of the blade assembly.

\* \* \* \* \*